United States Patent
Yuan et al.

(10) Patent No.: US 12,284,015 B2
(45) Date of Patent: Apr. 22, 2025

(54) PROCESSING UNIT REPORTING FOR SOUNDING REFERENCE SIGNAL PRECODER CALCULATION

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/760,422

(22) PCT Filed: Mar. 11, 2020

(86) PCT No.: PCT/CN2020/078701
§ 371 (c)(1),
(2) Date: Aug. 9, 2022

(87) PCT Pub. No.: WO2021/179190
PCT Pub. Date: Sep. 16, 2021

(65) Prior Publication Data
US 2023/0098329 A1    Mar. 30, 2023

(51) Int. Cl.
*H04B 7/06*    (2006.01)
*H04B 7/0456*    (2017.01)
(Continued)

(52) U.S. Cl.
CPC ......... *H04B 7/0628* (2013.01); *H04B 7/0456* (2013.01); *H04L 5/0051* (2013.01);
(Continued)

(58) Field of Classification Search
CPC ....... H04W 8/24; H04W 24/02; H04W 24/04; H04L 5/0048; H04L 5/005; H04L 5/0051;
(Continued)

(56) References Cited

U.S. PATENT DOCUMENTS 9,155,098 B2    10/2015    Geirhofer et al.
2019/0052378 A1    2/2019    Yiu et al.
(Continued)

FOREIGN PATENT DOCUMENTS

CN    110731098 A    1/2020
EP    2515563 A1    10/2012
(Continued)

OTHER PUBLICATIONS

Huawei., et al., "Remaining Issues on Full Power Transmission for UL MIMO", 3GPP TSG RAN WG1 Meeting #98bis, R1-1910075, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, 17 Pages, XP051808413, paragraph [ 0005].

(Continued)

*Primary Examiner* — Peter Chen
(74) *Attorney, Agent, or Firm* — Harrity & Harrity, LLP

(57) ABSTRACT

Various aspects of the present disclosure generally relate to wireless communication. In some aspects, a user equipment (UE) may generate a UE capability report that indicates a number of active processing units (PUs) supported by the UE for calculations during a PU occupation duration and transmit the UE capability report to a base station. Numerous other aspects are provided.

30 Claims, 8 Drawing Sheets

(51) Int. Cl.
    *H04L 5/00* (2006.01)
    *H04W 8/24* (2009.01)
    *H04W 24/02* (2009.01)
(52) U.S. Cl.
    CPC ............. *H04W 8/24* (2013.01); *H04W 24/02* (2013.01); *H04B 7/0626* (2013.01)
(58) Field of Classification Search
    CPC .. H04B 7/0621; H04B 7/0626; H04B 7/0628; H04B 7/0632; H04B 7/0456; H04B 7/0478
    See application file for complete search history.

(56) References Cited

U.S. PATENT DOCUMENTS

| | | | |
|---|---|---|---|
| 2019/0222282 A1 | 7/2019 | Tsai et al. | |
| 2019/0356364 A1* | 11/2019 | Maamari | H04L 5/0062 |
| 2021/0337415 A1* | 10/2021 | Chen | H04L 5/005 |

FOREIGN PATENT DOCUMENTS

| | | |
|---|---|---|
| WO | 2013148347 | 10/2013 |
| WO | WO-2019072138 A1 | 4/2019 |

OTHER PUBLICATIONS

Nokia: "DraftCR to 38.214 Capturing the RAN1#92bis Meeting Agreements", 3GPP TSG-RAN1 Meeting #92bis, R1-1805777-38214, 3rd Generation Partnership Project (3GPP), Mobile Competence Centre, 650, Route Des Lucioles, F-06921 Sophia-Antipolis Cedex, France, vol. RAN WG1, No. Sanya, P.R. China, Apr. 16, 2018-Apr. 20, 2018, May 1, 2018, 90 Pages, XP051448989, [paragraph [ 5.2.1.6], paragraph [ 6.2.1].

Supplementary European Search Report—EP20923768—Search Authority—Munich—Nov. 2, 2023.
Intel Corporation: "Remaining Issues for CSI Reporting", 3GPP TSG RAN WG1 #94b, R1-1810750, Chengdu, China Oct. 8-12, 2018, Oct. 12, 2018 (Dec. 10, 2018), pp. 1-5, Section 2.5, the whole document.
Intel Corporation: "Remaining Issues on CSI Reporting", 3GPP TSG RAN WG1 #93, R1-1806506, Busan, South Korea, May 21-25, 2018, May 25, 2018 (May 25, 2018), pp. 1-12, Sections 2.1-2.2.
International Search Report and Written Opinion—PCT/CN2020/078701—ISAEPO—Dec. 10, 2020.
Nokia: Corrections to 38.214 including alignment of terminology across specifications 3GPP TSG RAN WG1 #97, R1-1907964, Reno, Nevada, U.S.A., May 13-17, 2019, May 17, 2019 (May 17, 2019), 42 Pages, Section 5.2.1.6.
Qualcomm Incorporated: "Maintenance for CSI Reporting," 3GPP Draft, 3GPP TSG RAN WG1 Meeting #93, R1-1807340, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018 (May 20, 2018), XP051442532, 6 pages, Retrieved from the Internet: URL: http://www.3gpp.org/ftp/Meetings%5F3GPP%5FSYNC/RAN1/Docs/ [retrieved on May 20, 2018] the whole document, Section 3.1-3.4.
Qualcomm Incorporated: "Remaining Details on UE & gNB Measurements for NR Positioning", 3GPP Draft, R1-1912975, 3GPP TSG RAN WG1 #98, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Nov. 9, 2019 (Nov. 9, 2019), XP051823737, pp. 1-12, Retrieved from the Internet: URL: https://ftp.3gpp.org/tsg_ran/WG1_RL1/TSGR1_99/Docs/R1-1912975.zip R1-1912975.docx [retrieved on Nov. 9, 2019] p. 1-p. 12, p. 2, p. 8, p. 10.

* cited by examiner

PROCESSING UNIT REPORTING FOR SOUNDING REFERENCE SIGNAL PRECODER CALCULATION

CROSS-REFERENCE TO RELATED APPLICATION

This application is a 371 national stage of PCT Application No. PCT/CN2020/078701 filed on Mar. 11, 2020, entitled "PROCESSING UNIT REPORTING FOR SOUNDING REFERENCE SIGNAL PRECODER CALCULATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for processing unit reporting for sounding references signal precoder calculation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include generating a UE capability report that indicates a number of active processing units (PUs) supported by the UE for calculations during a PU occupation duration, and transmitting the UE capability report to a base station.

In some aspects, a method of wireless communication, performed by a base station, may include receiving, from a UE, a UE capability report that indicates a number of active PUs supported by the UE for calculations during a PU occupation duration, and configuring the UE for a plurality of channel state information reference signal (CSI-RS) and sounding reference signal (SRS) pairs based at least in part on the UE capability report.

In some aspects, a UE for wireless communication may include a memory and one or more processors operatively coupled to the memory. The memory and the one or more processors may be configured to generate a UE capability report that indicates a number of active PUs supported by the UE for calculations during a PU occupation duration, and transmit the UE capability report to a base station.

In some aspects, a base station for wireless communication may include a memory and one or more processors operatively coupled to the memory. The memory and the one or more processors may be configured to receive, from a UE, a UE capability report that indicates a number of active PUs supported by the UE for calculations during a PU occupation duration, and configure the UE for a plurality of CSI-RS and SRS pairs based at least in part on the UE capability report.

In some aspects, a non-transitory computer-readable medium may store one or more instructions for wireless communication. The one or more instructions, when executed by one or more processors of a UE, may cause the one or more processors to generate a UE capability report that indicates a number of active PUs supported by the UE for calculations during a PU occupation duration, and transmit the UE capability report to a base station.

In some aspects, a non-transitory computer-readable medium may store one or more instructions for wireless communication. The one or more instructions, when executed by one or more processors of a base station, may cause the one or more processors to receive, from a UE, a UE capability report that indicates a number of active PUs supported by the UE for calculations during a PU occupation duration, and configure the UE for a plurality of CSI-RS and SRS pairs based at least in part on the UE capability report.

In some aspects, an apparatus for wireless communication may include means for generating a UE capability report that indicates a number of active PUs supported by the apparatus for calculations during a PU occupation duration, and means for transmitting the UE capability report to a base station.

In some aspects, an apparatus for wireless communication may include means for receiving, from a UE, a UE capability report that indicates a number of active PUs supported by the UE for calculations during a PU occupation duration, and means for configuring the UE for a plurality of CSI-RS and SRS pairs based at least in part on the UE capability report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
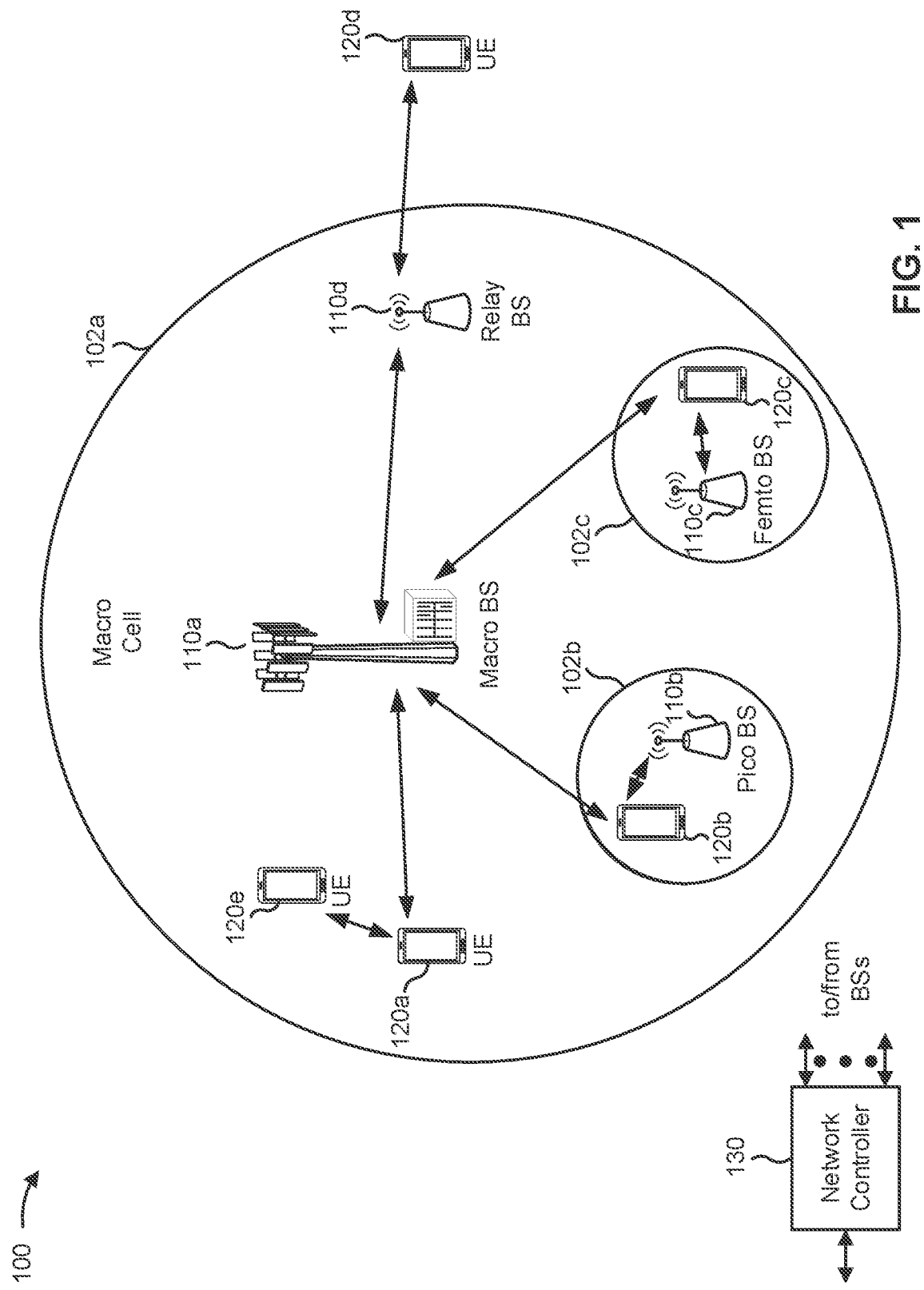
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart, phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internee of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In some aspects, as described elsewhere herein, UE 120 may have a minimum capability on active transmission configuration information (TCI) states, meaning that UE 120 supports a single active physical downlink shared channel (PDSCH) TCI state and two active physical downlink control channel (PDCCH) TCI states. In some aspects, a UE 120 with the minimum capability on active TCI states may derive a quasi-colocation (QCL) assumption of a channel state information reference signal (CSI-RS) (e.g., an aperiodic (AP) CSI-RS) based at least in part on a default CSI-RS QCL assumption for UEs with the minimum capability on active TCI states, as described herein. In some aspects, the default CSI-RS QCL assumption for UEs with the minimum capability on active TCI states may follow a default PDSCH QCL assumption for UEs with the minimum capability on active TCI states.

In general, any number of wireless networks may be deployed in a given geographic area. Each wireless network may support a particular radio access technology (RAT) and may operate on one or more frequencies. A. RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
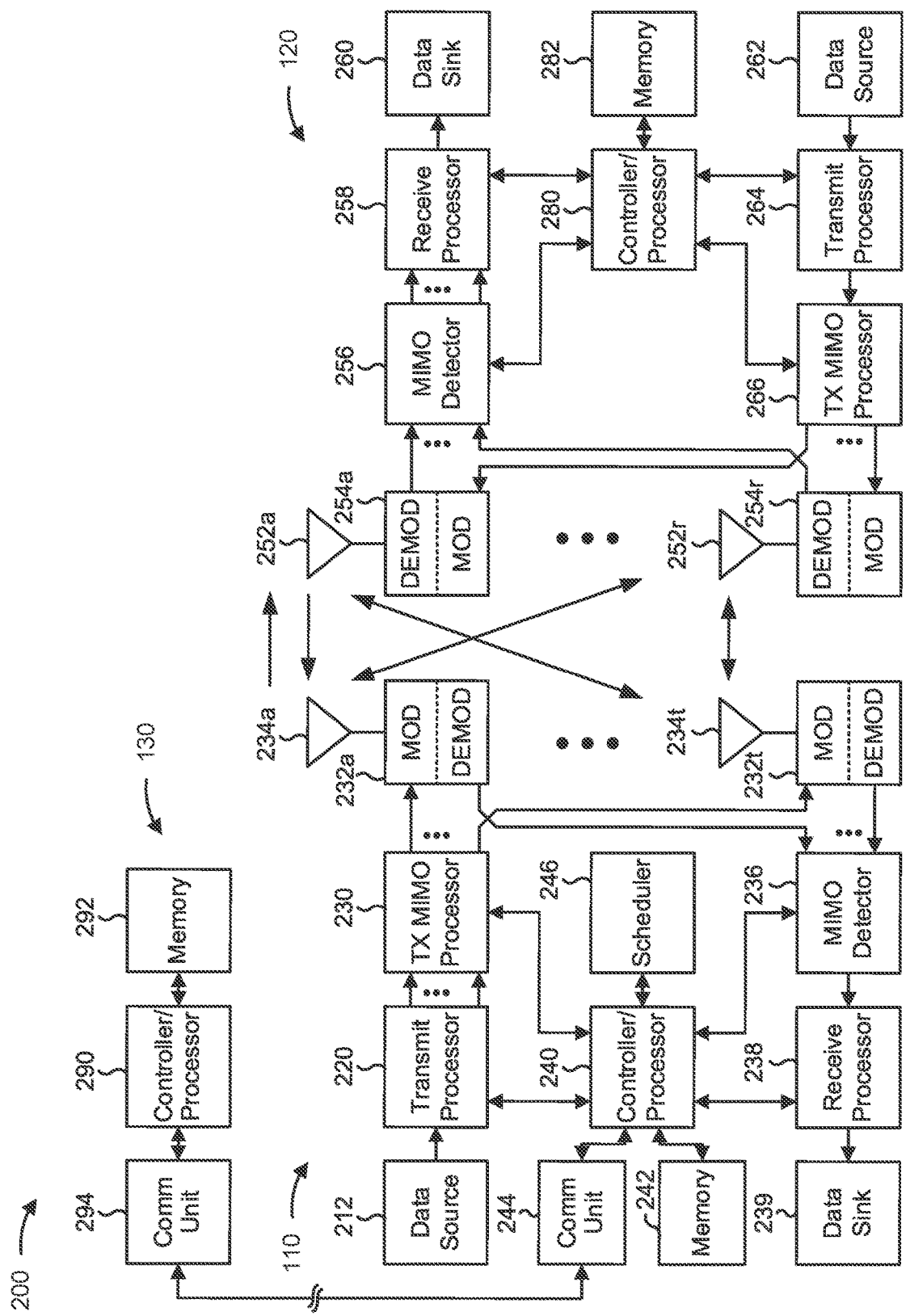
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS). A transmit (TX) multiple-input multiple-output (MIMO) processor 230 may perform spatial processing (e.g., preceding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other components) of FIG. 2 may perform one or more techniques associated with processing unit (PU) reporting for sounding reference signal (SRS) precoder calculation, as described in more detail elsewhere herein. For example, controller/processor 240 of base station 110, controller/processor 280 of UE 120, and/or any other components) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for generating a UE capability report that indicates a number of active PUs supported by the UE for calculations during a PU occupation duration, means for transmitting the UE capability report to a base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a UE capability report that indicates a number of active PUs supported by the UE for calculations during a PU occupation duration, means for configuring the UE for a plurality of CSI-RS and SRS pairs based at least in part on the UE capability report, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
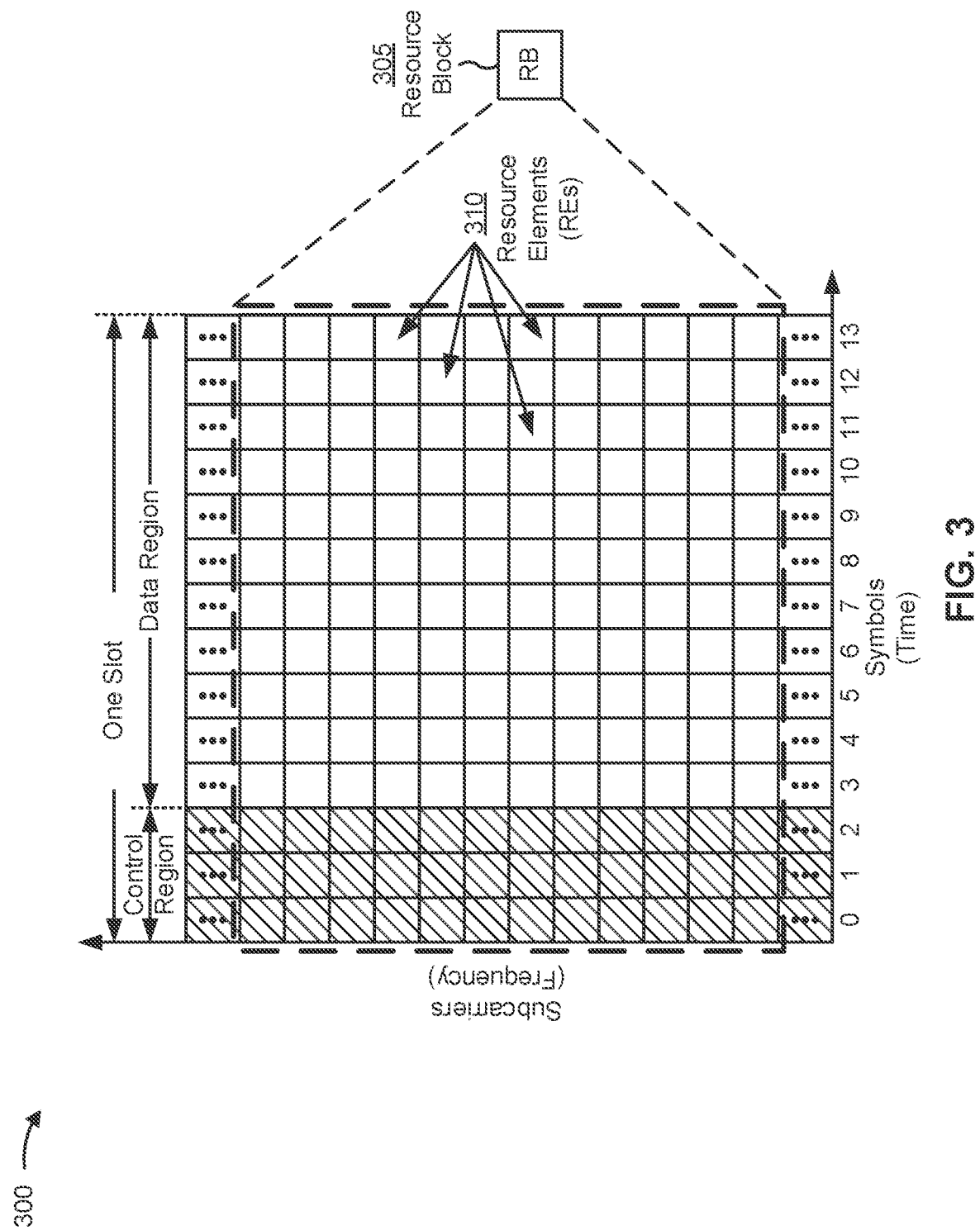
FIG. 3 is a diagram illustrating an example of a slot format, in accordance with various aspects of the present disclosure.

FIG. 3 is a diagram illustrating an example 300 of a slot format, in accordance with various aspects of the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

Figure 4:
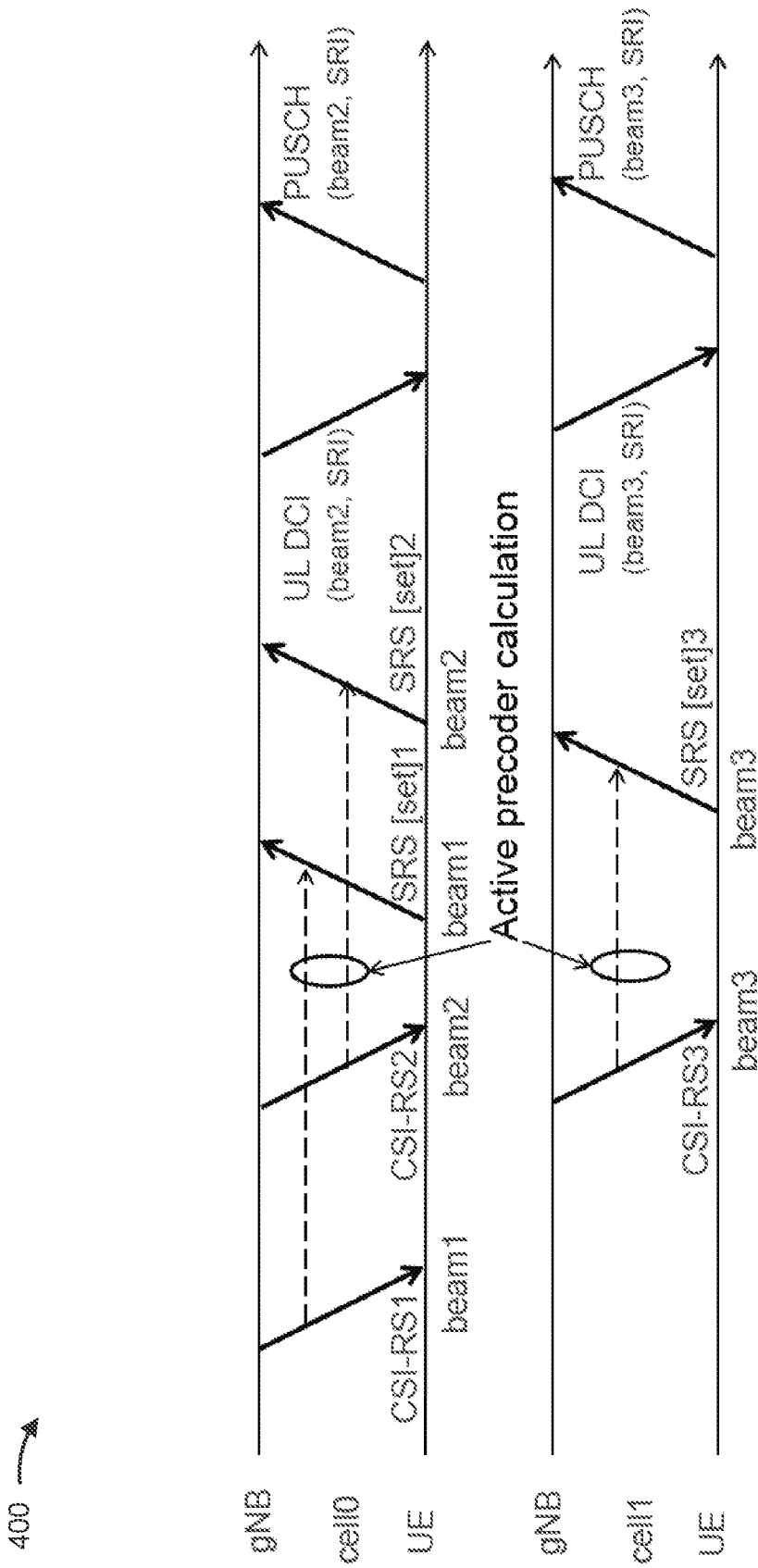
FIG. 4 is a diagram illustrating an example of active precoder calculations, in accordance with various aspects of the present disclosure.

FIG. 4 is a diagram illustrating an example 400 of active precoder calculations, in accordance with various aspects of the present disclosure. FIG. 4 shows a signaling timeline between a UE and a base station (e.g., gNB) in a first serving cell (cell0) and a gNB in a second serving cell (cell1).

A UE may transmit an SRS to the gNB, and the gNB may use the SRS to support multiuser scheduling. For example, the gNB may use SRSs from multiple UEs to estimate a channel quality between each UE and the gNB. In turn, the gNB may transmit a CSI-RS to help the UE to calculate a suitable precoder for another SRS transmission. The UE may calculate the precoder using one or more PUs.

FIG. 4 shows active precoder calculations by a UE for SRSs associated with CSI-RSs for non-codebook based (NCB) multiple input multiple output (MIMO). NCB means that, without use of a codebook, the UE may have to measure a downlink CSI-RS to calculate the precoder for an SRS transmission. For example, the UE may calculate a precoder using a channel estimate based on a received CSI-RS and transmit a precoded SRS using the precoder. The gNB may then select one or multiple precoders and indicate these to the UE using corresponding SRS resource indicators.

FIG. 4 shows a signaling timeline for cell0, where the UE may be signaled to receive a first CSI-RS (CSI-RS1) by a spatial filter, i.e., the first beam (beam1). The beam may be indicated as being associated with a reference signal, such as a CSI-RS, an SRS, or synchronization signal block (SSB). The UE may calculate a precoder for an SRS based on a measurement associated with the CSI-RS, as part of an active precoder calculation procedure. In another example, the UE may calculate a precoder for each SRS in an SRS resource set (SRS set1, which contains at least one SRS resource) based on a measurement associated with the CSI-RS, as part of an active precoder calculation procedure. The CSI-RS1 and the SRS1 (or SRS set1) may be considered a CSI-RS and SRS pair. The UE may transmit the precoded SRS1, (or SRSs in SRS set1) using the beam1, i.e., the same spatial filter as the one for the reception of CSI-RS1. The UE may also be signaled to receive a second CSI-RS (CSI-RS2), precode an SRS2 (or SRSs in SRS set2), and transmit the precoded SRS2 (or SRSs in SRS set 2) using a second spatial filter, i.e. the beam2. In the example for cell0, the UE has multiple CSI-RS and SRS pairs, where each pair may apply a different beam or spatial filter for the CSI-RS reception and the precoded SRS transmission, which requires a number of active PUs for precoder calculations. The calculation of precoders may include complicated operations such as channel estimation, matrix operation, and others. That is, the precoder calculations may be more complicated than the measurement for L1-RSRP, and PU rules for precoder calculation have not been specified.

FIG. 4 also shows that the UE may receive downlink control information (DCI) for uplink communication and may transmit information to the gNB in a physical uplink shared channel (PUSCH). The DCI may indicate a precoder indicator for the PUSCH based on a measurement of a precoded SRS or a precoded SRS set. The UE should be prepared for any precoder indicator that may be indicated in the DCI that is possibly associated with any one of multiple precoded SRS or multiple SRS sets. The precoder indicator in the DCI may be the SRS resource indicator.

FIG. 4 also shows a signaling timeline for cell1, where the UE may receive a CSI-RS (CSI-RS3), precode an SRS3 or SRS set 3, and transmit the SRS3 or SRS set3 using a third spatial filter, i.e., the beam3. In the signaling timeline for cell1, the UE may use one or more active PUs for only a single CSI-RS and SRS pair (CSI-RS3 and SRS3 or SRS set 3). This may require fewer PUs than for cell0.

As indicated above, FIG. 4 is provided as an example. Other examples may differ from what is described with respect to FIG. 4.

As shown by FIG. 4, a UE may have to perform active precoder calculations for one or more multiple CSI-RS and SRS pairs. The precoder calculations are non-trivial, and the UE may or may not be able to support precoder calculations for multiple CSI-RS and SRS pairs. If the gNB configures the UE for multiple CSI-RS and RS pairs when the UE is not able to support multiple CSI-RS and RS pairs, SRS transmissions may fail or may be inaccurate, and indicated precoders for PUSCH transmission may not be available.

According to various aspects describe herein, a UE may provide a UE capability report to the gNB. The UE capability report may indicate how many PUs the UE is capable of supporting for precoder calculations. The UE capability report may also indicate how many PUs the UE is capable of supporting for a combination of precoder calculations and CSI calculations. The UE capability report may further include a PU occupation duration. Based at least in part on the UF capability report, the gNB may configure a UE to handle a single CSI-RS and SRS pair or multiple CSI-RS and SRS pairs. Because a CSI-RS and SRS pair configuration is based on the UE capability report, the UE is less likely to suffer SRS inaccuracy or SRS transmission loss.

Figure 5:
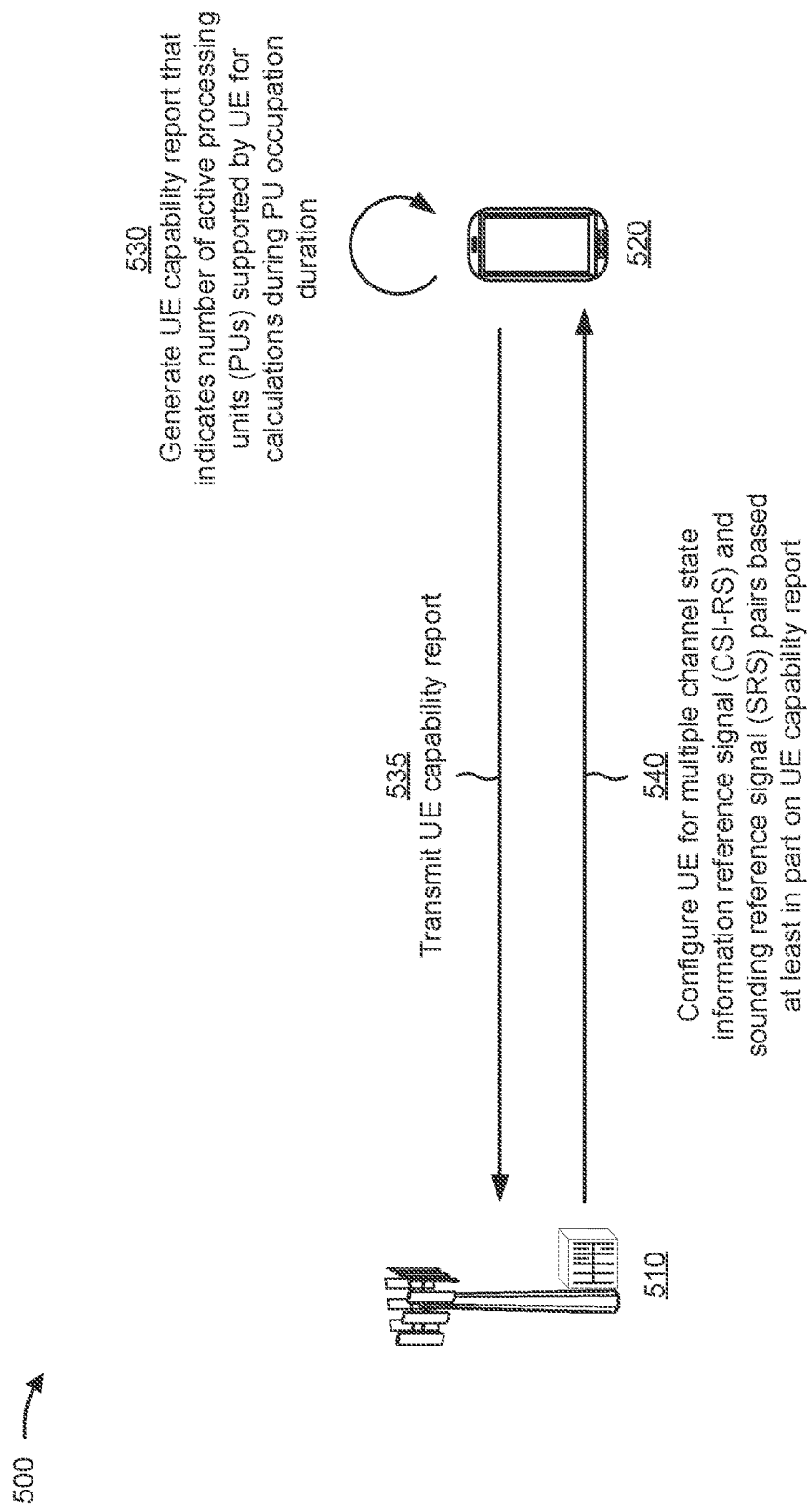
FIG. 5 is a diagram illustrating an example of processing unit (PU) reporting for sounding reference signal (SRS) precoder calculation, in accordance with various aspects of the present disclosure.

FIG. 5 is a diagram illustrating an example 500 of PU reporting for SRS precoder calculation, in accordance with various aspects of the present disclosure. FIG. 5 shows a base station (BS) 510 (e.g., BS 110 depicted in FIGS. 1 and 2, the gNB depicted in FIG. 4, and/or the like) and a UE 520 (e.g., UE 120 depicted in FIGS. 1 and 2, the UE depicted in FIG. 4, and/or the like) that may communicate with each other.

As shown by reference number 530, UE 520 may generate a UE capability report that indicates a number of active PUs supported by UE 520 for calculations in a given OFDM symbol. The calculations may include precoder calculations for preceding SRS or SRS sets, CSI calculations for reporting CSI information, or a combination of SRS precoder calculations and CSI calculations. In some aspects, the UE capability report may indicate a maximum number of active PUs for precoder calculations. The maximum number may be a maximum number of active PUs for precoder calculations across multiple cells configured for uplink NCB MIMO in carrier aggregation. For example, the UE capability report may indicate a supportable total number of active PUs for precoder calculations across multiple cells. In some aspects, the UE capability report may indicate an individual maximum number of active PUs for precoder calculations per each serving cell in carrier aggregation.

In some aspects, the UE capability report, may indicate a maximum number of active PUs for a combination of a number of active PUs for precoder calculations and a number of active PUs for CSI calculations. The number of active PUs for precoder calculations relative to the number of active PUs for CSI calculations may be based at least in part on information associated with BS 510. If a certain number L of PUs are occupied in a given OFDM symbol, UE 520 may have $N_{PU}$–L unoccupied PUs for the symbol, where $N_{PU}$ is a number of PUs supported by UE 520 for relevant calculations in a symbol.

As shown by reference number 535, UE 520 may transmit the UE capability report. UE 520 may transmit the UE capability report in uplink control information or a radio resource control (RRC) message. UE 520 may transmit the UE capability report upon connection to BS 510, periodically, or upon request.

As shown by reference number 540, BS 510 may configure UE 520 for multiple CSI-RS and SRS pairs based at least in part on the UE capability report. For example, if the UE capability report indicates a number of PUs that satisfies a PU threshold, BS 510 may configure UE 520 for multiple CSI-RS and SRS pairs (via DCI, PDCCH, an RRC message, a medium access control control element (MAC-CE), and/or the like). If the UE capability report indicates a number of PUs that does not satisfy the PU threshold, BS 510 may configure UE 520 for only one CSI-RS and SRS pair. As a result, UE 520 may be configured for a number of CSI-RS and SRS pairs appropriate for a capability of UE 520.

In some aspects, BS 510 may configure UE 520 by transmitting a message (e.g., DCI, PDCCH message, RRC message, MAC-CE, and/or the like) that instructs UE 520 to handle one CSI-RS and SRS pair or multiple CSI-RS and SRS pairs. Correspondingly, UE 520 may prepare PUs for one CSI-RS and SRS pair or for multiple CSI-RS and SRS pairs. As a result, UE 520 may be able to provide more accurate SRS and avoid SRS transmission failures.

A rank may be a number of layers to transmit the PUSCH in uplink NCB MIMO transmission by UE 520, or the number of SRSs to be precoded in an SRS resource set associated with a CSI-RS. A maximum rank may be a maximum number of layers in uplink NCB MIMO transmission that UE 520 may support, may be scheduled with, or the maximum number of SRSs in an SRS resource set associated with a CSI-RS. In some aspects, a number of active PUs may be needed for calculations of precoding the SRSs in an SRS resource set associated with a CSI-RS, which is based at least in part on a maximum rank of UE 520. For example, one active PU may be needed per precoder calculation of precoding the SRSs in an SRS resource set based at least in part on a determination that the maximum rank of the UE does not satisfy a rank threshold, or that two active PUs can be needed per precoder calculation of precoding the SRSs in an SRS resource set based at least in part on a determination that the maximum rank of the UE satisfies the rank threshold. For example, the rank threshold can be either reported or set as two. This means that if the UE is precoding four SRSs in an SRS set associated with a CSI-RS, two active PUs are needed in the precoder calculation, while one active PU is needed to precede two SRSs in an SRS set associated with a CSI-RS. In some aspects, the UE capability report may indicate a number of PUs needed per precoder calculation of precoding the SRSs in an SRS resource set, based at least in part on a determination that the maximum rank of the UE satisfies the rank threshold. In some aspects, the UE capability report may indicate a number of active PUs supported by the UE for calculations that are independent of a maximum rank of UE 520. For example, whether precoding four SRSs or two SRSs in an SRS set associated with a CSI-RS, one active PU may be needed.

As indicated above, FIG. 5 is provided as an example. Other examples may differ from what is described with respect to FIG. 5.

Figure 6:
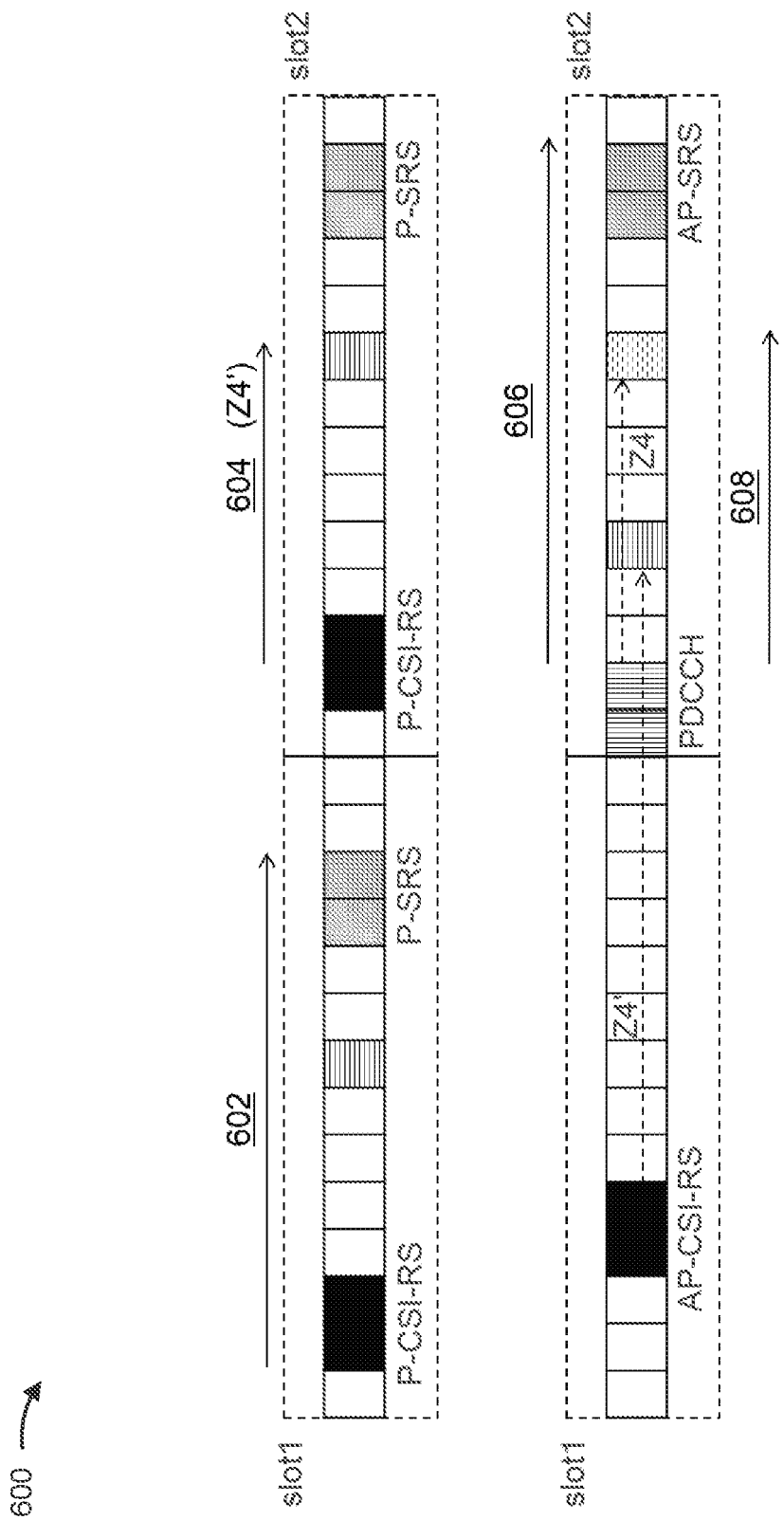
FIG. 6 is a diagram illustrating an example of PU occupation durations, in accordance with various aspects of the present disclosure.

FIG. 6 is a diagram illustrating an example 600 of PU occupation durations, in accordance with various aspects of the present disclosure. FIG. 6 shows durations during which PUs are occupied for precoder calculations and/or CSI calculations over two slots, where the PU is occupied for a duration of a precoder calculation. The durations may involve periodic CSI-RS (P-CSI-RS), periodic SRS (P-SRS), aperiodic CSI-RS (AP-CSI-RS), and/or aperiodic SRS (AP-SRS).

In some aspects, a PU occupation duration may be from a symbol (including the symbol) of a latest CSI-RS to a symbol of an associated SRS transmission. For example, FIG. 6 shows a PU occupation duration 602 that may be from a first symbol of a latest P-CSI to a last symbol of a P-SRS. In some aspects, the PU occupation duration may be from a symbol of a latest CSI-RS to a symbol an offset after the latest CSI-RS. For example, FIG. 6 shows a PU occupation duration 604 that may be from a symbol of a P-CSI to a Z4' symbol that is an offset number of symbols after the P-CSI. In some aspects, durations 602 and 604 may also be applicable to A-CSI, A-SRS, semi-persistent (SP)-CSI, SP-SRS, and/or the like.

In some aspects, a PU occupation duration may be from a symbol after a physical downlink control channel (PDCCH) triggering an SRS transmission to a symbol of the SRS transmission. For example, FIG. 6 shows a PU occupation duration 606 that is from a first symbol after the PDCCH triggering an AP-SRS to a last symbol of the AP-SRS. In some aspects, a PU occupation duration may be from a symbol after the PDCCH triggering an SRS transmission to a symbol an offset after the PDCCH. For example, FIG. 6 shows a PU occupation duration 608 that may be from a first symbol after the PDCCH triggering the AP-SRS to a symbol that is offset a Z4 number of symbols after the PDCCH. As a result of the UE capability report, indicating a number of PUs and/or a PU occupation duration, a UE may be able to provide as many precoded SRS transmissions as appropriate for a capability of the UE in order to improve communications between a gNB and the UE.

Figure 7:
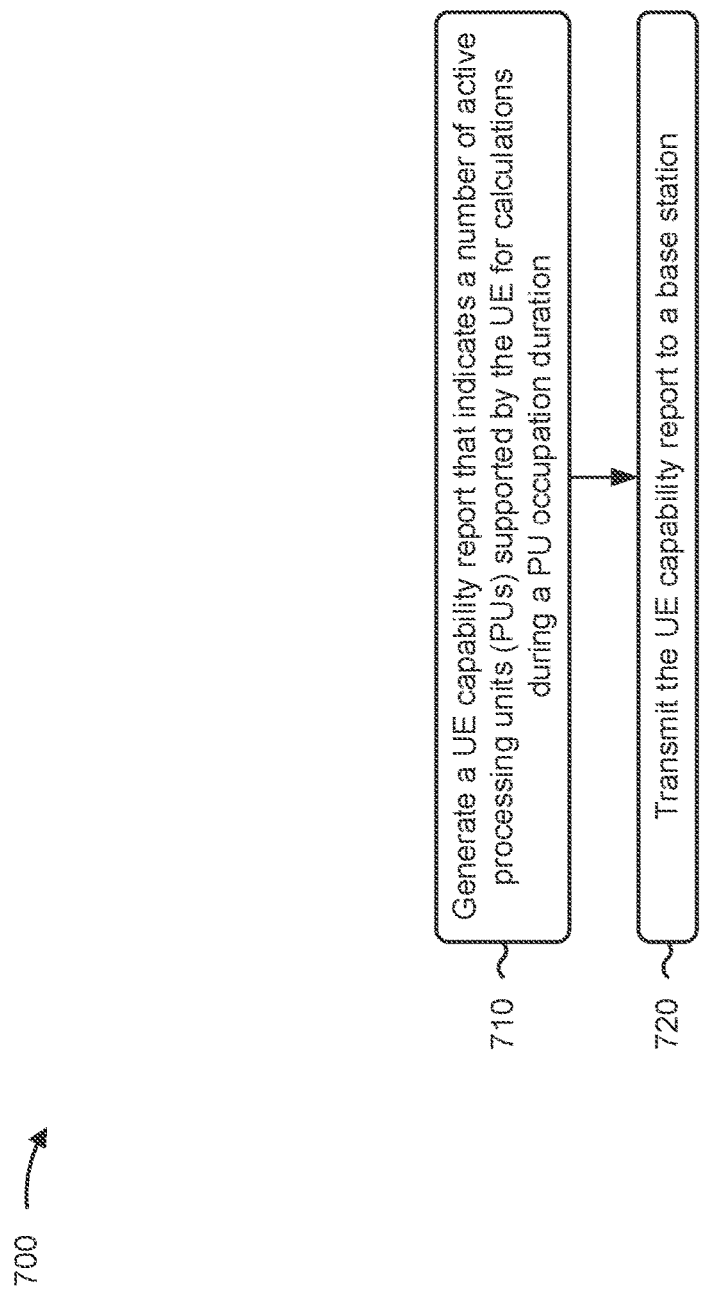
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 depicted in FIGS. 1 and 2, the UF depicted in FIG. 4, UE 520 depicted in FIG. 5, and/or the like) performs operations associated with PU reporting for SRS precoder calculation.

As shown in FIG. 7, in some aspects, process 700 may include generating a UE capability report that indicates a number of active PUs supported by the UE for calculations during a PU occupation duration (block 710). For example, the UE (e.g., using receive processor 258, transmit processor 264, controller/processor 280, memory 282, and/or the like) may generate a UE capability report that indicates a number of active PUs supported by the UE for calculations during a PU occupation duration, as described above.

As further shown in FIG. 7, in some aspects, process 700 may include transmitting the UE capability report to a base station (block 720). For example, the UE (e.g., using receive processor 258, transmit processor 264, controller/processor 280, memory 282, and/or the like) may transmit the UE capability report to a base station, as described above.

Process 700 may include additional aspects, such as any single aspect or any combination of aspects described below and/or in connection with one or more other processes described elsewhere herein.

In a first aspect, the number is a maximum number of active PUs for precoder calculations.

In a second aspect, alone or in combination with the first aspect, the maximum number is a maximum number of active for precoder calculations across cells configured for uplink NCB multiple input multiple output.

In a third aspect, alone or in combination with one or more of the first and second aspects, the maximum number is a maximum number of active PUs for precoder calculations per serving cell.

In a fourth aspect, alone or in combination with one or more of the first through third aspects, the number is a maximum number of active PUs for a combination of a number of active PUs for precoder calculations and a number of active PUs for CSI calculations.

In a fifth aspect, alone or in combination with one or more of the first through fourth aspects, the number of active PUs for precoder calculations relative to the number of active PUs for CSI calculations is based at least in part on information associated with the base station.

In a sixth aspect, alone or in combination with one or more of the first through fifth aspects, the number of active PUs supported by the UE for calculations is based at least in part on a maximum rank of the UE.

In a seventh aspect, alone or in combination with one or more of the first through sixth aspects, the UE capability report indicates that one active PU is to be supported per precoder based at least in part on a determination that the maximum rank of the UE does not satisfy a rank threshold, or that two active PUs are to be supported per precoder based at least in part on a determination that the maximum rank of the UE satisfies the rank threshold.

In an eighth aspect, alone or in combination with one or more of the first through seventh aspects, the number of active PUs supported by the UE for calculations is independent of a maximum rank of the UE.

In a ninth aspect, alone or in combination with one or more of the first through eighth aspects, the PU occupation duration is from a symbol of a latest CSI-RS to a symbol of an associated sounding reference signal transmission.

In a tenth aspect, alone or in combination with one or more of the first through ninth aspects, the PU occupation duration is from a symbol of a latest CSI-RS to a symbol an offset after the latest CSI-RS.

In an eleventh aspect, alone or in combination with one or more of the first through tenth aspects, the PU occupation duration is from a symbol after a physical downlink control channel triggering an SRS transmission to a symbol of the SRS transmission.

In a twelfth aspect, alone or in combination with one or more of the first through eleventh aspects, the PU occupation duration is from a symbol after a PDCCH triggering an SRS transmission to a symbol an offset after the PDCCH.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
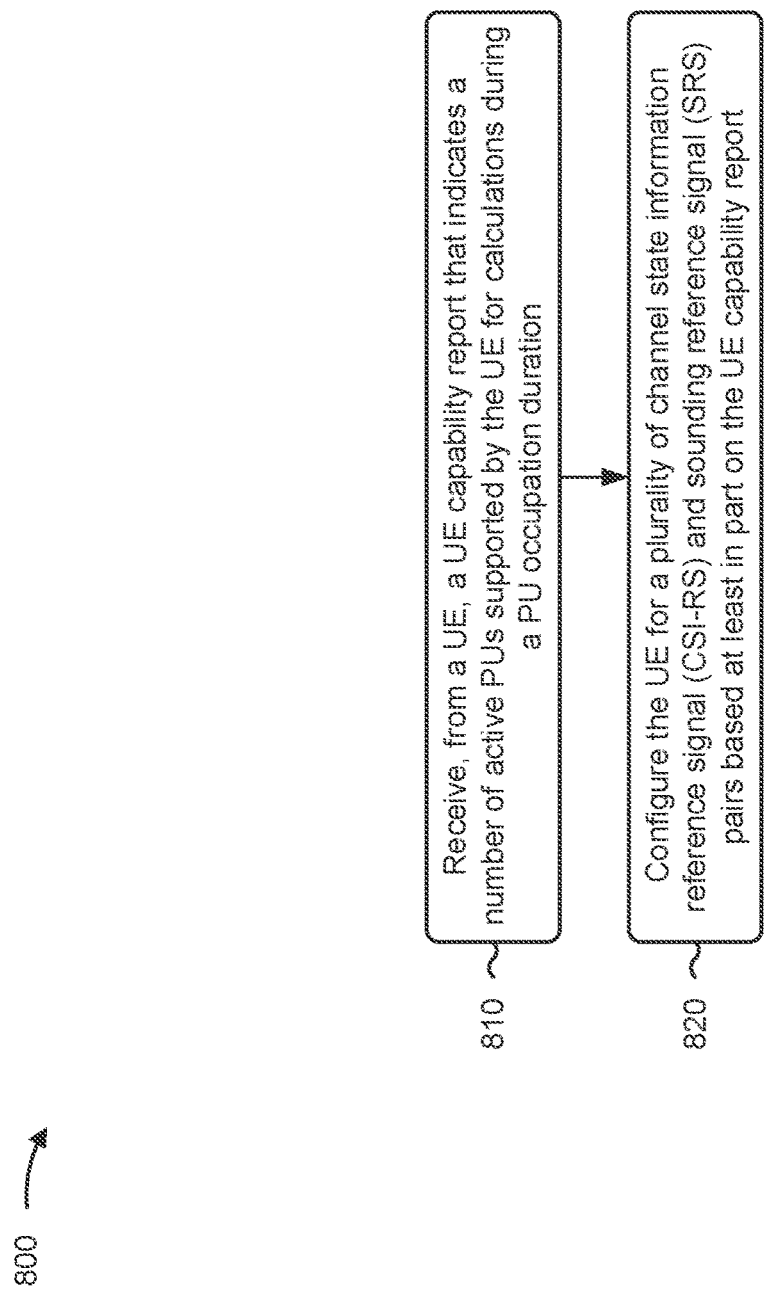
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., BS 110 depicted in FIGS. 1 and 2, the gNB depicted in FIG. 4, BS 510 depicted in FIG. 5, and/or the like) performs operations associated with PU reporting for SRS precoder calculation.

As shown in FIG. 8, in some aspects, process 800 may include receiving, from a UE, a UE capability report that indicates a number of active PUs supported by the UE for calculations during a PU occupation duration (block 810). For example, the base station (e.g., using transmit processor 220, receive processor 238, controller/processor 240, memory 242, and/or the like) may receive, from a UE, a UE capability report that indicates a number of active PUs supported by the UE for calculations during a PU occupation duration, as described above.

As further shown in FIG. 8, in some aspects, process 800 may include configuring the UE for a plurality of CSI-RS and SRS pairs based at least in part on the UE capability report (block 820). For example, the base station (e.g., using transmit processor 220, receive processor 238, controller/processor 240, memory 242, and/or the like) may configure the UE for a plurality of CSI-RS and SRS pairs based at least in part on the UE capability report, as described above.

Process 800 may include additional aspects, such as any single aspect or any combination of aspects described below and/or in connection with one or more other processes described elsewhere herein.

In a first aspect, the number s a maximum number of active PUs supported by the UE for precoder calculations.

In a second aspect, alone or in combination with the first aspect, the maximum number is a maximum number of active PUs supported by the UE for precoder calculations across cells configured for uplink NCB multiple input multiple output.

In a third aspect, alone or in combination with one or more of the first and second aspects, the maximum number is a maximum number of active PUs supported by the UE for precoder calculations per serving cell.

In a fourth aspect, alone or in combination with one or more of the first through third aspects, the number is a maximum number of active PUs supported by the UE for a combination of a number of active PUs for precoder calculations and a number of active PUs for CSI calculations.

In a fifth aspect, alone or in combination with one or more of the first through fourth aspects, the number of active PUs supported by the UE for precoder calculations relative to the number of active PUs for CSI calculations is based at least in part on information associated with the base station.

In a sixth aspect, alone or in combination with one or more of the first through fifth aspects, the number of active PUs supported by the UE for calculations is based at least in part on a maximum rank of the UE.

In a seventh aspect, alone or in combination with one or more of the first through sixth aspects, the UE capability report indicates that one active PU is to be supported per precoder based at least in part on a determination that the maximum rank of the UE does not satisfy a rank threshold, or that two active PUs are to be supported per precoder based at least in part on a determination that the maximum rank of the UE satisfies the rank threshold.

In an eighth aspect, alone or in combination with one or more of the first through seventh aspects, the number of active PUs supported by the UE for calculations is independent of a maximum rank of the UE.

In a ninth aspect, alone or in combination with one or more of the first through eighth aspects, the PU occupation duration is from a symbol of a latest CSI-RS to a symbol of an associated SRS transmission.

In a tenth aspect, alone or in combination with one or more of the first through ninth aspects, the PU occupation duration is from a symbol of a latest CSI-RS to a symbol between the latest CSI-RS and a symbol of an associated SRS transmission.

In an eleventh aspect, alone or in combination with one or more of the first through tenth aspects, the PU occupation duration is from a symbol after a physical downlink control channel triggering an SRS transmission to a symbol of the SRS transmission.

In a twelfth aspect, alone or in combination with one or more of the first through eleventh aspects, the PU occupation duration is from a symbol after a PDCCH triggering an SRS transmission to a symbol an offset after the PDCCH.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more," Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   generating a UE capability report that indicates a number of active processing units (PUs) supported by the UE for calculations during a PU occupation duration, wherein the active PUs are PUs designated for performing calculations for at least one of: precoder computations, or channel state information (CSI) computations during the PU occupation duration;
   transmitting the UE capability report to a network entity; and
   receiving, from the network entity, a configuration for a set of channel state information reference signal (CSI-RS) and sounding reference signal (SRS) pairs based at least in part on the UE capability report, wherein only one pair is configured when the number of active PUs does not satisfy a threshold and multiple pairs are configured when the number of active PUs satisfies the threshold.

2. The method of claim 1, wherein the number is a maximum number of active PUs for precoder calculations.

3. The method of claim 2, wherein the maximum number is a maximum number of active PUs for precoder calculations across cells configured for uplink non-codebook based multiple input multiple output.

4. The method of claim 2, wherein the maximum number is a maximum number of active PUs for precoder calculations per serving cell.

5. The method of claim 1, wherein the number is a maximum number of active PUs for a combination of a number of active PUs for precoder calculations and a number of active PUs for channel state information (CSI) calculations.

6. The method of claim 5, wherein the number of active PUs for precoder calculations relative to the number of active PUs for CSI calculations is based at least in part on information associated with the network entity.

7. The method of claim 1, wherein the number of active PUs supported by the UE for calculations is based at least in part on a maximum rank of the UE.

8. The method of claim 7, wherein the UE capability report indicates that one active PU is to be supported per precoder based at least in part on a determination that the maximum rank of the UE does not satisfy a rank threshold, or that two active PUs are to be supported per precoder based at least in part on a determination that the maximum rank of the UE satisfies the rank threshold.

9. The method of claim 1, wherein the number of active PUs supported by the UE for calculations is independent of a maximum rank of the UE.

10. A method of wireless communication performed by a network entity, comprising:
   receiving, from a user equipment (UE), a UE capability report that indicates a number of active processing units (PUs) supported by the UE for calculations during a PU occupation duration, wherein the active PUs are PUs designated for performing calculations for at least one of: precoder computations, or channel state information (CSI) computations during the PU occupation duration; and
   configuring the UE for a set of channel state information reference signal (CSI-RS) and sounding reference signal (SRS) pairs based at least in part on the UE capability report, wherein only one pair is configured when the number of active PUs does not satisfy a threshold and multiple pairs are configured when the number of active PUs satisfies the threshold.

11. The method of claim 10, wherein the number is a maximum number of active PUs supported by the UE for precoder calculations.

12. The method of claim 10, wherein the number is a maximum number of active PUs supported by the UE for a combination of a number of active PUs for precoder calculations and a number of active PUs for CSI calculations.

13. The method of claim 10, wherein the number of active PUs supported by the UE for calculations is based at least in part on a maximum rank of the UE.

14. The method of claim 10, wherein the number of active PUs supported by the UE for calculations is independent of a maximum rank of the UE.

15. A user equipment (UE) for wireless communication, comprising:
   one or more memories; and
   one or more processors coupled to the one or more memories, the one or more processors configured to:
      generate a UE capability report that indicates a number of active processing units (PUs) supported by the UE for calculations during a PU occupation duration, wherein the active PUs are PUs designated for performing calculations for at least one of: precoder computations, or channel state information (CSI) computations during the PU occupation duration;
      transmit the UE capability report to a network entity; and
      receive, from the network entity, a configuration for a set of channel state information reference signal (CSI-RS) and sounding reference signal (SRS) pairs based at least in part on the UE capability report, wherein only one pair is configured when the number of active PUs does not satisfy a threshold and multiple pairs are configured when the number of active PUs satisfies the threshold.

16. The UE of claim 15, wherein the number is a maximum number of active PUs for precoder calculations.

17. The UE of claim 16, wherein the maximum number is a maximum number of active PUs for precoder calculations across cells configured for uplink non-codebook based multiple input multiple output.

18. The UE of claim 16, wherein the maximum number is a maximum number of active PUs for precoder calculations per serving cell.

19. The UE of claim 15, wherein the number is a maximum number of active PUs for a combination of a number of active PUs for precoder calculations and a number of active PUs for channel state information (CSI) calculations.

20. The UE of claim 15, wherein the number of active PUs supported by the UE for calculations is based at least in part on a maximum rank of the UE.

21. The UE of claim 15, wherein the number of active PUs supported by the UE for calculations is independent of a maximum rank of the UE.

22. The UE of claim 15, wherein the PU occupation duration is from a symbol of a latest CSI-RS to a symbol of an associated SRS transmission.

23. The UE of claim 15, wherein the PU occupation duration is from a symbol of a latest CSI-RS to a symbol an offset after the latest CSI-RS.

24. The UE of claim 15, wherein the PU occupation duration is from a symbol after a physical downlink control channel triggering an SRS transmission to a symbol of the SRS transmission.

25. A network entity for wireless communication, comprising:
   one or more memories; and
   one or more processors coupled to the one or more memories, the one or more processors configured to:
      receive, from a user equipment (UE), a UE capability report that indicates a number of active processing units (PUs) supported by the UE for calculations during a PU occupation duration, and wherein the active PUs are PUs designated for performing calculations for at least one of: precoder computations, or channel state information (CSI) computations during the PU occupation duration; and
      configure the UE for a set of channel state information reference signal (CSI-RS) and sounding reference signal (SRS) pairs based at least in part on the UE capability report, wherein only one pair is configured when the number of active PUs does not satisfy a threshold and multiple pairs are configured when the number of active PUs satisfies the threshold.

26. The network entity of claim 25, wherein the number of active PUs supported by the UE for calculations is independent of a maximum rank of the UE.

27. The network entity of claim 25, wherein the PU occupation duration is from a symbol of a latest CSI-RS to a symbol of an associated SRS transmission.

28. The network entity of claim 25, wherein the PU occupation duration is from a symbol of a latest CSI-RS to a symbol between the latest CSI-RS and a symbol of an associated SRS transmission.

29. The network entity of claim 25, wherein the PU occupation duration is from a symbol after a physical downlink control channel triggering an SRS transmission to a symbol of the SRS transmission.

30. The network entity of claim 25, wherein the PU occupation duration is from a symbol after a physical downlink control channel (PDCCH) triggering an SRS transmission to a symbol an offset after the PDCCH.

* * * * *